STEP 1 — INNER SURFACE OF MOLD COATED WITH A MOLD RELEASE AGENT COMPRISING A MIXTURE OF (1) ESTER OF POLYVINYL ALCOHOL AND A SATURATED FATTY ACID HAVING 12-20 CARBON ATOMS AND (2) WAX.

STEP 2 — MOLD FILLED WITH FOAMABLE POLYURETHANE COMPOSITION.

STEP 3 — POLYURETHANE FOAM FORMED.

STEP 4 — MOLD HEATED TO CURE POLYURETHANE AND MELT THE MOLD RELEASE AGENT.

STEP 5 — MOLDED ARTICLE REMOVED FROM MOLD WHILE MOLD RELEASE IS LIQUID.

INVENTOR.
JOHN F. SZABAT
BY
ATTORNEY.

United States Patent Office 3,210,448
Patented Oct. 5, 1965

3,210,448
METHOD OF MOLDING A CELLULAR POLY-URETHANE ARTICLE HAVING A POROUS SURFACE
John E. Szabat, New Martinsville, W. Va., assignor to Mobay Chemical Company, Pittsburgh, Pa., a corporation of Delaware
Filed Apr. 17, 1962, Ser. No. 188,237
6 Claims. (Cl. 264—48)

This invention relates to cellular polyurethane plastics and more particularly to an improved process for molding cellular polyurethane plastics.

The manufacture of foam plastics containing urethane groups is known. Cellular polyurethane plastics may be produced by mixing the liquid components thereof and allowing them to react and expand to form a cellular product. For example, one may combine an organic polyisocyanate, water and an organic compound containing at least two active hydrogen groups in a mixer such as is disclosed, for example, in United States Letters Patent Reissue 24,514 issued to Peter Hoppe et al., on August 12, 1958, and place the mixed ingredients into a mold of the desired shape where they will react and expand to form a cellular product. These reactions are known to be spontaneous and exothermic. It is also known to produce cellular polyurethane plastics under anhydrous conditions from polyesters having terminal carboxyl groups and organic polyisocyanates through both a chain extension reaction between the carboxyl group of the acid and a gas producing reaction between the same components. However, when the molding of polyurethane foam is attempted, a skin is formed by the compression of the foam substance against the wall of the mold under the action of gas pressure. This skinning effect seems to be inherent in polyurethane foams. The resulting molded cellular polyurethane article also strongly adheres to the surfaces of the mold unless the mold has previously been treated with a mold release agent. Mold release plays an important part in the molding of polyurethane foam since it must result in foam release without regard for careful handling and it must provide a continuous skin or no skin at all on the molded item.

It has been found to be desirable in order to assist the removal of the molded article from the mold to coat the mold with a release agent such as silicone oils or hard paraffin. These release agents do not always provide carefree release of the molded article and considerable force is required to pull the molded article from the mold. These mold release agents also are to facilitate removal only and do not alter the structure of the outer surface of the molded article. The removal of the foamed article is generally satisfactory with the use of release agents, but if the molds are not coated quite uniformly with the separating substance, the skin will tear when the article is removed from the mold, and thus an article of unattractive appearance will result.

Molded items should have a neat appearance for commercial reasons and it is almost imperative that these molded items have a continuous uniform surface. The skin on the surface of the molded article can be either impervious or porous as long as it conveys continuity of beauty and is free of imperfections. Porous skins are preferred over the impervious skins as the porous skins breathe, i.e., permit the unrestricted passage of air in and out of the structure when in use. Whether a skin is porous or impermeable is dependent upon the mold release agent employed.

It is an object of this invention to provide improved molded cellular polyurethane plastics. It is another object of this invention to provide an improved method for molding cellular polyurethane plastics. It is still another object of this invention to provide molded cellular polyurethane articles having a thin, soft, highly-porous skin. It is a further object of this invention to provide molded cellular polyurethane articles having a skin which is free of imperfections.

The process of the present invention is illustrated by the flow sheet of the drawing.

The foregoing objects and others which will become apparent from the following description are accomplished in accordance with the invention, generally speaking, by providing molded cellular polyurethanes prepared in molds which have been coated with a mixture of an ester of polyvinyl alcohol and a saturated fatty acid having from 12 to 20 carbon atoms and a wax having a melting point of from about 140° F. to about 300° F. Thus, this invention provides a process for making molded cellular polyurethane articles, said process comprising placing the mixed liquid components of a cellular polyurethane into a mold which has been coated with a thin layer of a mixture of an ester of polyvinyl alcohol and a saturated fatty acid having from 12 to 20 carbon atoms and a wax having a melting point of from about 140° F. to about 300° F., allowing the components to react to form a cellular polyurethane foam article, heating the mold after the foam has begun to cure, causing the coating to melt, and thereby promote carefree release of the molded object by removing the molded object from the liquid coating layer in the mold.

When the coating is not sufficiently melted during the molding cycle, the foam will either stick to the mold or release will be difficult. The molded article is removed from the mold when the mold temperature is above the melting point of the ester and wax coating. Release from the mold is quick and easy and a thin, soft, continuous, highly-porous skin is formed. The coating has to be applied for each molding cycle for best results.

Any suitable mold release agent preferably having about 4 percent by weight to about 50 percent by weight of an ester of a polyvinyl alcohol and a fatty acid having from 12 to 20 carbon atoms, and about 50 percent by weight to about 96 percent by weight of a wax having a melting point from about 140° F. to about 300° F. may be used. Any suitable fatty acid may be used including, for example, lauric, tridecoic, myristic, pentadecanoic, palmitic, magric, stearic, nondecylic, arachidic acid and the like. The term, polyvinyl alcohol as used herein is as defined by the "Encyclopedia of Chemical Technology," volume 14, pages 710–713, published by Interscience Publishers, Inc., 1955, and includes all resins prepared by the hydrolysis of polyvinyl acetate. On partial hydrolysis, proportional amounts of residual $CH_3COO$-groups are distributed along the chain and the amount of such acetate groups expressed as a percentage is the "acetate content." Any suitable polyvinyl alcohol may be used. Thus, for example, in a polyvinyl alcohol of 40 percent acetate content, 60 percent of the acetate groups of the original polyvinyl acetate were hydrolyzed to hydroxyl groups, and 40 percent remain as acetate groups. A preferred group of polyvinyl alcohols are those having an acetate content of from about 10 percent to about 40 percent and a specific gravity measured at 20° C. of from about 1.274 to about 1.316. As a specific example of an ester of a polyvinyl alcohol and a fatty acid, the product obtained by reacting polyvinyl alcohol having a 20 percent acetate content and a specific gravity measure at 20° C. of 1.301 with a sufficient amount of stearic acid to react with substantially all of the hydroxyl groups and the like may be used.

Although the concentration of ester in the release agent may preferably vary from about 4 percent by weight to about 50 percent by weight, it is preferred that the mold release contain about 12 percent by weight to about 20 percent by weight of said ester. Polyvinyl stearates and the like are preferred.

Although the mold release composition may contain 50 percent by weight to about 96 percent by weight wax having a melting point range of about 140° F. to about 300° F., a melting point of 170° F. to 220° F. is preferred and most preferably from about 180° F. to about 190° F. Suitable waxes include both synthetic and natural waxes having the above mentioned properties. Suitable natural waxes include, for example, Chinese insect wax, shellac wax, montan wax, ozocerite wax, carnauba wax, ouricury wax, sugar cane wax, natural paraffin wax, and the like.

Suitable synthetic waxes include, for example, those prepared from the esterification of a fatty acid and an alcohol, said ester preferably having a molecular weight of from about 200 to about 1500. Suitable fatty acids which may be used to prepare the synthetic waxes include, for example, lauric, myristic, palmitic, stearic, arachidic, behenic, carnuaba, cerotic, melissic and the like. Suitable alcohols which may be used to prepare synthetic waxes of the ester type include, for example, cetyl, stearyl, octadecyl, arachyl, carnubyl, ceryl, myricyl, pisangceryl alcohol and the like. Etheylene glycol, diethylene glycol, polyethylene glycol, sorbitol and the like may also be esterified with the above-mentioned fatty acids to give high melocular weight waxlike products. Specific waxes, such as those disclosed in the "Encyclopedia of Chemical Technology," volume 15, pages 1–17, published by The Interscience Publishers, 1956, are, for example, the monostearate of glycerol, the distearate of glycerol, the tristearate of glycerol, and the like. Any suitable synthetic wax having a melting point of about 140° F. to about 300° F. and preferably 170° F. to about 220° F., and most preferably from about 180° F. to about 190° F. may be used. Amide waxes of higher fatty acids may also be used as a mold release agent, such as, for example, stearamides which are high-melting-point waxes with melting points in the range of about 130° F. to about 300° F., such as, for example, N,N'-ethylene-bis-stearamide and the like.

A mixture of any of the above-mentioned esters of polyvinyl alcohol and a fatty acid and a wax which may be suitable to practice the present invention is dispersed in an inert organic solvent medium, such as, for example, mineral spirits, said mineral spirits comprising, for example, naphtha, and aliphatic hydrocarbons distilling in the range of from about 75° F. to about 330° F. and preferably from about 200° F. to about 330° F., such as, for example, hexadecane, heptadecane, octadecane, and nonadecane. Solvents having a high flash point or no flash point at all can also be used, such as, for example, trichlorofluoromethane, methylene chloride, 1,1,2-trifluoro-1,2,2-trichloroethane, carbon tetrachloride, 1,1,2-trichloroethylene and the like.

Various methods may be utilized to coat the mold, such as, for example, applying the coating solution with a brush or with a spray gun, or by dipping the mold into the coating solution. For best results a thin layer of release agent should be applied to the mold. If the mold is coated with an excessive amount of wax, a non-porous skin will result.

Any suitable mold may be used for the preparation of the molded cellular polyurethane article, such as, for example, molds with floating lids, or molds with clamped lids. Metal molds are preferred, such as, for example, steel, stainless steel, brass, and copper, however, aluminum molds are especially preferred. It is preferred to apply the coating release agent to a hot mold surface to insure complete flashing or evaporation of the solvent vehicle of the coating mixture. If the solvent is not satisfactorily evaporated, the foam will stick to the mold.

Any suitable oven or other method of heating may be employed to heat the mold providing the principles of convection heating are followed. Suitable ovens include, for example, circulating air and radiant ovens. The circulating air oven should be heated to a temperature of about 250° F. to about 450° F., and preferably to a temperature of about 350° F. to about 450° F. The radiant oven should be heated to a temperature of about 350° F. to about 550° F. and preferably to a temperature of about 450° F.

Mold heating should be programmed to melt the coating after gellation of the foam occurs. When the coating is not sufficiently melted during the mold cycle, the foam will stick to the mold and release will be difficult. If the coating is allowed to melt too early in the mold cycle, that is, before the foam begins to cure, capillary action of the uncured foam causes the melted, liquid wax to penetrate the foam and to interfere with the foam curing causing loose skin and promoting foam sticking. If the molding conditions are properly programmed, the wax can also be a liquid coating on the mold. Heating the mold to a high temperature of from about 170° F. to about 230° F. at the beginning of the mold cycle and before the foaming mixture is placed into the mold causes the foam to cure quite rapidly, that is, before the capillary action of the uncured foam causes the liquid wax to interfere with the foam curing.

In practicing the present invention in its preferred form, the components employed in the manufacture of a cellular polyurethane are mixed and transferred into a preheated mold which has been coated with, for example, a solution comprised of 2 percent by weight polyvinyl stearate prepared from a polyvinyl alcohol having an acetate content of 20 percent and a specific gravity measured at 20° C. of 1.301 and sufficient stearic acid to react with substantially all of the hydroxyl groups, 2 percent by weight, N,N'-ethylenebis-stearamide, 8.5 percent by weight of a synthetic wax of the ester type prepared from 1 mol of palmitic acid and 1 mol of stearyl alcohol having a melting point of about 180° F. to about 190° F. and 87.5 percent by weight of mineral spirits distilling at a temperature of from 200° F. to 330° F. After the mold has been coated and the reaction mixture transferred thereinto, the components of the reaction mixture react and expand to form a cellular product. When the polyurethane foam has begun to cure, the mold is then heated to a temperature higher than the melting point of the mold release coating after which the cellular product is removed easily and quickly from the mold, said product having a soft, uniform, continuous, highly-porous skin.

Any suitable organic polyisocyanate may be used for the preparation of the cellular polyurethane plastic of this invention, such as, for example, those disclosed in United States Reissue Patent 24,514 to Hoppe et al., issued August 12, 1958. Arylene diisocyanates are preferred, such as, for example, 2,4-toluylene diisocyanate, 2,6-toluylene diisocyanate, p,p'-diphenyl methane diisocyanate, 1,5-naphthalene diisocyanate, triphenyl methane triisocyanate and the like. Particularly suitable arylene diisocyanates for this reaction is a mixture of about 20 percent 2,6-toluylene diisocyanate and about 80 percent 2,4-toluylene diisocyanate.

Unrefined isocyanates may also be used, such as, the crude mixture of isocyanates obtained by the phosgenation of the reaction product of aniline and formaldehyde which contains a mixture of di- and higher polyisocyanates or by phosgenating a mixture of toluylene diamines which is primarily a mixture of ortho- and para-toluylene diamines. A preferred product is one having from about 26 to about 33 percent free —NCO and an amine equivalent of about 120 to about 150, such as, for example, a product having about 32 percent free —NCO and an amine equivalent of about 140.

Any suitable organic compound containing at least two active hydrogen containing groups as determined by the Zerewitinoff test may be used, such as, for example, hydroxyl polyesters, polyhydric polyalkylene ethers, polyhydric polythioethers, polyacetals and polyester amides. It is preferred that the organic compound have a molecular weight above about 500 and most preferably within the range of about 1000 to 5000, a hydroxyl number of not more than about 225 and preferably within the range of about 20 to 112 and acid numbers, where applicable, preferably below about 10 and most preferably below about 1.

Any suitable hydroxyl polyester may be used, such as, for example, the reaction product of a polycarboxylic acid with an excess of a polyhydric alcohol. Any suitable polycarboxylic acid may be used, such as, for example, adipic acid, sebacic acid, phthalic acid, terephthalic acid, maleic acid, malonic acid, thiodipropionic acid and the like. Any suitable polyhydric alcohol may be used, such as, for example, ethylene glycol, propylene glycol, butylene glycol, amylene glycol, glycerine, trimethylol propane, pentaerythritol and the like.

Any suitable polyhydric polyalkylene ether may be used such as, for example, the condensation product of alkylene oxides and a polyhydric alcohol. Any suitable alkylene oxide may be used, such as, for example, ethylene oxide, propylene oxide, butylene oxide, amylene oxide and the like. It is preferred to employ polyhydric polyalkylene ethers prepared from alkylene oxides having from two to five carbon atoms, such as, for example, polypropylene ether glycol, polyethylene ether glycol, polybutylene ether glycol or mixtures thereof having a molecular weight of at least about 500. Moreover, the condensation product of the aforementioned alkylene oxides and a polyhydric alcohol having from 2 to 4 hydroxyl groups, such as, for example, ethylene glycol, propylene glycol, trimethylol propane, glycerol, triethanol amine, pentaerythritol and the like may be used. The polyhydric polyalkylene ethers may be prepared by any known process, such as, for example, by the process described by Wurtz in 1859 and in "Encyclopedia of Chemical Technology," vol. 7, pages 257 to 262, published by Interscience Publishers, Inc., 1951, or in U.S. Patent 1,922,459.

Any suitable polyhydric polythioether may be used, such as, for example, the reaction product of a polyhydric alcohol with a thioether glycol. Any suitable polyhydric alcohol may be used, such as, for example, ethylene glycol, propylene glycol, butylene glycol, trimethylol propane, pentaerythritol and the like. Any suitable thioether glycol may be used, such as, for example, diethylene glycol thioether and the like.

Any suitable polyacetal may be used, such as, for example, the reaction product of an aldehyde, such as, for example, formaldehyde, with a polyhydric alcohol, such as, for example, ethylene glycol or one of the other polyhydric alcohols disclosed above for the reaction with the polycarboxylic acids and/or alkylene oxides used in the preparation of the hydroxyl polyesters and polyethers respectively.

Any suitable polyester amide may be used, such as, for example, the reaction product of an amine, such as ethylene diamine and an alkylene glycol such as ethylene glycol with a polycarboxylic acid as disclosed for the preparation of the hydroxyl polyesters.

One may also employ halo hydrocarbons either alone or with water in conjunction with the balance of the components of the cellular polyurethane plastic. Any suitable blowing agent, which is a gas at the reaction temperature, such as, for example, dichlorodifluoromethane, trichlorofluoromethane, dichlorofluoromethane, dichlorotetrafluoroethane and the like may be used. The employment of these compounds is not an essential feature of the invention, however, It is often advantageous to carry out the reaction in the presence of a catalyst. Any suitable catalyst may be used, such as, for example, dibutyl tin di-2-ethyl hexoate, stannous octoate, triethylene diamine, N-ethyl morpholine, N-methyl morpholine, dimethyllauryl amine, and the like. In any case and especially in the production of cellular polyurethane plastics based on the above described polyhydric polyalkylene ethers by a one-step process, it is advantageous to employ mixtures of the metal containing catalyst and the tertiary amine catalyst.

In many cases it is desirable and indeed in some cases it may be necessary to carry out the reaction in the presence of a stabilizer or emulsifier. In the production of cellular polyurethane plastics based on polyhydric polyalkylene ethers by a one-step process wherein the water, an organic polyisocyanate and a polyhydric polyalkylene ether are mixed together substantially simultaneously in a single step and inserted into the mold, it has been found necessary to carry out the reaction in the presence of a silicone oil which contains some mixed oxyalkylene block copolymer in the molecule. Suitable silicone oils for this process may be found in U.S. Patent 2,834,748 to Bailey et al., issued May 13, 1958. In the preparation of cellular polyurethane plastics from organic polyisocyanate modified polyhydric polyalkylene ethers having terminal —NCO groups by reaction thereof with water, it is advantageous to employ a substantially linear dimethyl polysiloxane having a viscosity of about 50 cps. at 25° C. The same silicone oil may be used as a stabilizer in the production of a cellular polyurethane plastic based on polyesters. Emulsifiers such as the sulfonated oils, for example, sulfonated castor oil, are also suitable.

Shaped articles of cellular polyurethane foam having a porous surface with excellent breathing properties can be produced by the present invention. The soft, uniform, highly-porous surface and the excellent breathing properties make the product of this invention particularly useful in the manufacture of furniture cushions, pillows, bedding, topper pads, and the like.

The invention is further illustrated by the following examples in which the parts are by weight unless otherwise specified.

*Example 1*

About 100 parts of a trihydric polyalkylene ether obtained from the condensation of propylene oxide with glycerine in the molar ratio of about 50:1, condensed to a molecular weight of about 3000 and having an hydroxyl number of about 56, about 42.5 parts of a mixture of 80 percent 2,4-toluylene diisocyanate and 20 percent 2,6-toluylene diisocyanate, about 3.5 parts of water, about 1.5 parts of a silicone oil having the formula:

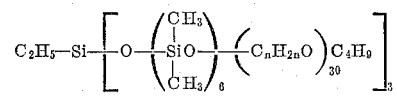

wherein $(C_nH_{2n}O)$ is a mixed polyoxyethylene and oxypropylene block copolymer containing about 17 oxyethylene units and about 13 oxypropylene units, about 0.2 part of triethylenediamine and about 0.07 part of dibutyl tin di-2-ethyl hexoate were combined in a machine mixer such as is disclosed in U.S. Reissue Patent 24,514 to Hoppe, et al., issued August 12, 1958, and inserted into an aluminum mold shell which had been spray coated with a mixture of synthetic waxes dispersed in an organic solvent, said coating having the following composition: 2 percent polyvinyl stearate prepared from polyvinyl alcohol having an acetate content of 20 percent and a specific gravity measured at 20° C. of 1.301 with sufficient stearic acid to react with substantially all of the hydroxyl groups, 2 percent N, N'-ethylenebis-stearamide, 8.5 percent of a synthetic wax of the ester type prepared from 1 mol of palmitic acid and 1 mol of stearyl alcohol having a melting point of from 180° F. to 190° F., and 87.5 percent mineral spirits distilling at a temperature of from 300° F. to 330° F. The physical properties of the mold release coating are as follows:

Melting point _____ °F__ 180
Viscosity _____ cps. at 25° C__ 200

The temperature of the mixture of liquid reactive ingredients at the time that they were placed in the aluminum mold shell was about 86° F. A free floating lid was placed over the top of the mold and placed in an oven equipped with radiant heaters i.e., chrome ribbon heaters within about 20 seconds after the mold was charged. The temperature of the covered mold is raised from about 86° F. to about 212° F. in about 2 minutes after which the mold was heated at 212° F. for 10 minutes. The mold cover is then removed and the molded cellular polyurethane plastic is easily and quickly released from the liquid layer in the mold. The resulting pillow had a uniform, highly-porous surface and the following physical properties:

| | |
|---|---|
| Density _____ lbs./ft.³__ | 2.2 |
| Tensile strength _____ lbs./in.²__ | 20 |
| Elongation _____ percent__ | 300 |
| Tear strength _____ lbs./in.²__ | 3 |
| Compression 25% rest _____ lbs./50 in.²__ | 18 |
| Compression set _____ percent__ | 15 |

*Example 2*

About 69 parts of a trihydric polyalkylene ether obtained from the condensation of propylene oxide with glycerine in the molar ratio of about 50:1 condensed to a molecular weight of about 3000 and having an hydroxyl number of about 56, about 23 parts of a polypropylene ether glycol having a molecular weight of about 2000 and an hydroxyl number of about 56, about 41.5 parts of a mixture of 80 percent 2,4-toluylene diisocyanate and 20 percent 2,6-toluylene dissocyanate, about 35 parts of water, about 2.0 parts of a silicone oil having the formula:

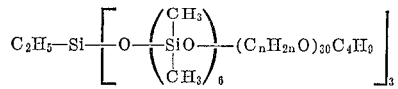

wherein ($C_nH_{2n}O$) is a mixed polyoxyethylene and oxypropylene block copolymer containing about 17 oxyethylene units and about 13 oxypropylene units, about 0.2 part of a triethylene diamine and about 0.07 part of dibutyl tin-di-2-ethyl hexoate were combined in a machine mixer such as disclosed in U.S. Reissue Patent 24,514 to Hoppe et al., issued August 12, 1958, and inserted into an aluminum mold shell which had been spray coated with a mixture of waxes dispersed in an organic solvent, said coating having the same composition as that used in Example I with the exception that carnauba wax was substituted for the synthetic ester type wax. The temperature of the mixture of liquid reactive ingredients at the time that they were placed in the aluminum mold shell was about 86° F. A free floating lid was placed over the top of the mold and placed in an oven equipped with radiant heaters, i.e., chrome ribbon heaters within about 20 seconds after the mold was charged. The temperature of the covered mold is raised from about 86° F. to about 212° F. in about 2 minutes after which the mold was heated at 212° F. for 10 minutes. When the mold cover and the molded cellular polyurethane plastic were removed from the mold, the resulting cellular polyurethane plastic had a uniform, soft, highly-porous surface and had the following physical properties:

| | |
|---|---|
| Density _____ lbs./ft.³__ | 1.6 |
| Tensile strength _____ lbs./in.²__ | 22 |
| Elongation _____ percent__ | 310 |
| Tear strength _____ lbs./in.²__ | 2.8 |
| Compression 25% rest _____ lbs./50 in.²__ | 18 |
| Compression set _____ percent__ | 11 |

It is to be understood that any of the other suitable organic polyisocyanates, blowing agents, organic compounds containing at least two active hydrogen groups in the molecule, catalysts, stabilizers, and the like described herein, can be substituted for the particular ones employed in the preceding examples with satisfactory results. Moreover, any suitable ester of polyvinyl alcohol and a saturated fatty acid having from 12 to 20 carbon atoms, or any suitable wax having a melting point of about 140° F. to about 300° F., or any suitable organic solvent can be substituted for those in the preceding examples with satisfactory results providing the teachings of the preceding disclosure are followed.

Although the invention has been described in considerable detail in the foregoing for the purpose of illustration, it is to be understood that such detail is solely for this purpose and that variations can be made therein by those skilled in the art without departing from the spirit and scope of the invention except as set forth in the claims.

What is claimed is:

1. A method of molding a polyurethane foam having a porous surface which comprises placing a foamable polyurethane reaction mixture in a mold protected by a mold release comprising a fatty acid ester of polyvinyl alcohol and a wax, permitting foaming to form a solidified foam, heating the mold, thereby melting the mold release and thereafter removing the resulting molded object from the mold while said mold release is liquid.

2. A method for molding a cellular polyurethane having a porous surface which comprises placing liquid reactants capable of forming a cellular polyurethane into a mold coated with a mixture of an ester of a polyvinyl alcohol and a saturated fatty acid having from 12 to 20 carbon atoms and a wax having a melting point of about 140° F. to about 300° F., allowing said liquid reactants to react and form a molded foam article, heating the mold after the foam has begun to cure to a temperature above the melting point of the mold release coating, allowing the mold release coating to melt, and removing the molded article from the mold from a liquid ester and wax layer.

3. In the molding of a cellular polyurethane wherein a foamable reaction mixture is placed in a mold to react to form a foam, the improvement which comprises coating the mold's innersurface with a mold release agent prior to placing said reaction mixture therein, said mold release agent being comprised of a mixture of an ester of polyvinyl alcohol and a saturated fatty acid having 12 to 20 carbon atoms and a wax having a melting point of about 140° F. to about 300° F., said coating causing the surface of the foam to have a highly porous skin.

4. The method in accordance with claim 1 in which the ester of polyvinyl alcohol and a saturated fatty acid is polyvinyl stearate.

5. A method of molding a polyurethane foam having a porous surface which comprises placing a foamable polyurethane reaction mixture in a mold protected by a mold release comprising a fatty acid ester of polyvinyl alcohol and a wax, permitting foaming to form a solidified foam, and thereafter removing the resulting molded object from the mold while said mold release is liquid, said polyvinyl alcohol having an acetate content from about 10 percent to about 40 percent and a specific gravity at 20° C. of about 1.274 to about 1.316.

6. A method for molding a cellular polyurethane article having a substantially uniform porous surface which comprises placing in a mold a foamable polyurethane composition, said mold having a substantially continuous coating on its inner surface of a mixture of an ester of polyvinyl alcohol and a saturated fatty acid having from 12 to 20 carbon atoms and a wax having a melting point of about 140° F. to about 300° F., permitting the foamable mixture to form a cellular polyurethane therein, and thereafter removing the molded article while the coating is melted.

(References on following page)

References Cited by the Examiner

UNITED STATES PATENTS

| | | | |
|---|---|---|---|
| 1,809,445 | 6/31 | Heuck et al. | |
| 2,136,425 | 11/38 | Fields | 18—39 |
| 2,804,653 | 9/57 | Talalay | 18—47 XR |
| 2,851,330 | 9/58 | Taylor | 112—5.3 XR |
| 2,872,706 | 2/59 | Jordan | 18—39 |
| 2,879,196 | 3/59 | Brucker | 156—155 |
| 3,006,033 | 10/61 | Knox | 18—48 |
| 3,012,287 | 12/61 | Tucker | 18—47 XR |
| 3,058,162 | 10/62 | Grabowski | 18—48 |
| 3,101,244 | 8/63 | Hood et al. | 18—48 |

OTHER REFERENCES

Mobay publication, "Molding Flexible Polyether Methane Foams," by P. L. Gemeinhardt et al., Spring 1960, pp. 6–12.

ALEXANDER H. BRODMERKEL, *Primary Examiner.*

WILLIAM J. STEPHENSON, *Examiner.*